US012381203B2

(12) United States Patent
Lee et al.

(10) Patent No.: US 12,381,203 B2
(45) Date of Patent: Aug. 5, 2025

(54) METHOD FOR MANUFACTURING ANODE, AND SECONDARY BATTERY WITH IMPROVED RAPID CHARGING PERFORMANCE, HAVING ANODE ACCORDING THERETO

(71) Applicant: SK ON CO., LTD., Seoul (KR)

(72) Inventors: Dong-Hoon Lee, Daejeon (KR); Hwan-Ho Jang, Daejeon (KR); Hyo-Sung Lim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/505,116

(22) Filed: Nov. 9, 2023

(65) Prior Publication Data
US 2024/0079560 A1 Mar. 7, 2024

Related U.S. Application Data

(63) Continuation of application No. 17/044,408, filed as application No. PCT/KR2019/016159 on Nov. 22, 2019, now Pat. No. 11,876,215.

(30) Foreign Application Priority Data

Nov. 22, 2018 (KR) .................. 10-2018-0145016
Nov. 22, 2019 (KR) .................. 10-2019-0151221

(51) Int. Cl.
*H01M 4/36* (2006.01)
*H01M 4/04* (2006.01)
(Continued)

(52) U.S. Cl.
CPC ......... *H01M 4/364* (2013.01); *H01M 4/0435* (2013.01); *H01M 4/131* (2013.01);
(Continued)

(58) Field of Classification Search
CPC .... H01M 4/364; H01M 4/0435; H01M 4/131; H01M 4/133; H01M 4/134; H01M 4/366;
(Continued)

(56) References Cited

U.S. PATENT DOCUMENTS 8,481,195 B1 * 7/2013 Liu .................. H01M 50/434
429/188
9,601,775 B2 * 3/2017 Fukumine ........... H01M 4/0404
(Continued)

FOREIGN PATENT DOCUMENTS

CN 101208819 A 6/2008
CN 101378135 * 12/2010 .............. H01M 4/13
(Continued)

OTHER PUBLICATIONS

Office Action on the Chinese Patent Application No. 201980019258.7 issued by the Chinese Patent Office on Jun. 9, 2023.

*Primary Examiner* — Helen Oi K Conley
(74) *Attorney, Agent, or Firm* — IP & T GROUP LLP

(57) ABSTRACT

The present invention relates to a secondary battery comprising a cathode, an anode and a separator interposed between the cathode and the anode, wherein the anode comprises an anode current collector and an anode mixture layer formed on at least one surface of the anode current collector, the anode mixture layer comprises an anode active material, a binder, and a conductive material, a loading amount of the anode mixture layer is 5 mg/cm² to 15 mg/cm², and value R of the anode mixture layer is 3,000 or less, wherein R means (permeability of the anode mixture layer)×(current density of a battery)². According to the present invention, an overvoltage phenomenon of an anode surface and the deposition of lithium metal caused thereby can be prevented so that charging can be performed with a
(Continued)

higher current, and thus rapid charging performance is improved, and lifespan is excellent even in the same current.

11 Claims, 1 Drawing Sheet

(51) Int. Cl.
  *H01M 4/131* (2010.01)
  *H01M 4/133* (2010.01)
  *H01M 4/134* (2010.01)
  *H01M 4/62* (2006.01)
  *H01M 4/66* (2006.01)
  *H01M 10/0525* (2010.01)
  *H01M 50/46* (2021.01)

(52) U.S. Cl.
  CPC ........... *H01M 4/133* (2013.01); *H01M 4/134* (2013.01); *H01M 4/366* (2013.01); *H01M 4/621* (2013.01); *H01M 4/661* (2013.01); *H01M 10/0525* (2013.01); *H01M 50/46* (2021.01)

(58) Field of Classification Search
  CPC .. H01M 4/621; H01M 4/661; H01M 10/0525; H01M 50/46; H01M 2004/027; H01M 4/02; H01M 4/13; H01M 4/36; H01M 4/587; H01M 4/62; H01M 10/052; Y02E 60/10
  See application file for complete search history.

(56) References Cited

U.S. PATENT DOCUMENTS

| | | | | |
|---|---|---|---|---|
| 2010/0143798 A1* | 6/2010 | Zhamu | .................. | H01M 4/133 977/734 |
| 2012/0258343 A1 | 10/2012 | Takahata et al. | | |

FOREIGN PATENT DOCUMENTS

| | | | | | |
|---|---|---|---|---|---|
| CN | 102067363 A | | 5/2011 | | |
| CN | 107851778 A | | 3/2018 | | |
| CN | 107851795 A | | 3/2018 | | |
| CN | 107925057 A | | 4/2018 | | |
| CN | 105336922 | * | 7/2018 | .......... | H01M 4/1395 |
| JP | 2005135838 A | * | 5/2005 | ............ | Y02E 60/50 |
| JP | 2010-140795 | * | 6/2010 | ............ | H01M 10/11 |
| JP | 2017183236 A | | 10/2017 | | |
| KR | 10-2008-0022132 A | | 3/2008 | | |
| KR | 10-2008-0040049 A | | 5/2008 | | |
| KR | 10-2011-0033134 A | | 3/2011 | | |
| KR | 10-2016-0056497 A | | 5/2016 | | |
| KR | 20170007140 A | | 1/2017 | | |
| KR | 20170019213 A | | 2/2017 | | |
| KR | 10-2017-0047976 A | | 5/2017 | | |
| WO | WO 01/84659 | * | 11/2001 | .......... | H01M 10/052 |
| WO | 2014133070 A1 | | 9/2014 | | |
| WO | 2017/074109 A1 | | 5/2017 | | |
| WO | 2017/111542 A1 | | 6/2017 | | |
| WO | 2017/142261 A1 | | 8/2017 | | |

* cited by examiner

METHOD FOR MANUFACTURING ANODE, AND SECONDARY BATTERY WITH IMPROVED RAPID CHARGING PERFORMANCE, HAVING ANODE ACCORDING THERETO

This application is a continuation of U.S. patent application Ser. No. 17/044,408 filed on Oct. 1, 2020, which claims priority to the national stage application of PCT/KR2019/016159 filed on Nov. 22, 2019, which claims priority of Korean patent application number 10-2018-0145016 filed on Nov. 22, 2018 and 10-2019-0151221 filed on Nov. 22, 2019. The disclosure of each of the foregoing applications is incorporated herein by reference in its entirety.

TECHNICAL FIELD

The present invention relates to a secondary battery having improved rapid charging performance, more specifically to an anode for a secondary battery having improved rapid charging performance and a secondary battery including the same.

BACKGROUND ART

Development of portable electronic devices, such as mobile phones, laptop computers, or the like, is bringing about rapid growth in demand for a secondary battery to be used as a power source. Recently, secondary batteries have been practically used as a power source of hybrid electric vehicles (HEV) and electric vehicles (EV). Accordingly, extensive studies on secondary batteries are being conducted to meet various demands. In particular, there is a recent trend that a demand for a lithium secondary battery having a high energy density and a high discharge voltage and output is increasing.

A lithium secondary battery used for EVs, or the like, not only needs to have a high energy density and exhibit high output in a short period of time but also should be able to be used for at least 10 years under severe conditions in which charging and discharging at high current are repeated in a short period of time, it is necessary to have remarkably superior characteristics with respect to output and long life as compared to conventional small-sized lithium secondary batteries.

In particular, recently developed EVs are equipped with a rapid charging mode and a slow charging mode, thus maximizing user's convenience. It inevitably requires a significantly high current density of the battery in order to charge a lithium secondary battery having a high-energy density at high speed. In contrast, when a lithium ion battery is charged with high current density, a short-term overvoltage is generated on a surface of an anode (<0 V vs Li/Li$^+$), thereby facilitating precipitation of lithium metal and decomposition of an electrolytic solution and deterioration of the life of the battery. In order to develop a battery without a deterioration in lifespan even under rapid charging conditions, a technology for developing an anode capable of accepting lithium ions at a faster rate is required.

DISCLOSURE

Technical Problem

In consideration of the above problems, the present invention is provided to provide an anode for a secondary battery having improved rapid charging performance and a secondary battery including the same.

Technical Solution

According to an aspect of the present invention, a secondary battery comprising a cathode, an anode and a separator interposed therebetween is provided, wherein the anode comprises an anode current collector; and an anode mixture layer formed on at least one surface of the anode current collector, and wherein the anode mixture layer comprises an anode active material, a binder and a conductive material; a loading amount of the anode mixture layer is 5 mg/cm$^2$ to 15 mg/cm$^2$; and an R value of the anode mixture layer is 3,000 or less, where R is (permeability of the anode mixture layer)×(current density of the battery)$^2$.

The R value of the anode mixture layer may be 2,000 or less.

Permeability of the anode mixture layer may be 145 sec/100 cc or less.

The anode active material may be artificial graphite.

The anode active material may include artificial graphite as a first active material, and one or more selected from natural graphite, soft carbon, hard carbon, Si, Sn, Al, Ge, Pb, Bi, an Sb—Si—Z alloy, an Sn—Z alloy, a lithium titan oxide, a vanadium oxide and a lithium vanadium oxide, as a second anode active material, wherein the first anode active material is included in an amount of 50 wt % or more (where the Z is any one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te and Po).

A glass transition temperature of the binder may be −15° C. to 0° C.

A density of the anode may be 1.65 g/cc or less.

A loading amount of the anode mixture layer may be 8 mg/cm$^2$ to 15 mg/cm$^2$.

The conductive material may include one or more selected from carbon black, acetylene black, furnace black, Ketjenblack, artificial graphite, natural graphite, silver, aluminum and copper.

According to another aspect, a method for manufacturing an anode is provided, the method including applying an anode slurry comprises an anode active material, a binder and a conductive material onto an anode current collector and drying the same to form an anode mixture layer; and first rolling and second rolling the anode current collector formed with the anode mixture layer, wherein a ratio of a thickness of the anode mixture layer reduced by the first rolling to a thickness of the anode mixture layer reduced by the second rolling is 70:30 to 35:65.

A temperature of a rolling roll of the first and second rolling may be 40° C. or less.

Advantageous Effects

According to the present invention, an overvoltage of an anode surface and deposition of lithium metal in accordance therewith can be prevented, such that charging can be performed with a higher current, thereby improving rapid charging performance and leading to an excellent lifespan at a certain current.

BEST MODE

Hereinbelow, preferred embodiments of the present invention will be described with reference to various example embodiments. However, the present invention can be embodied in various forms, and is not limited to the embodiments below.

The present invention relates to a secondary battery having improved rapid charging performance. According to an aspect, a secondary battery includes a cathode, an anode and a separator interposed therebetween, wherein the anode comprises an anode current collector; and an anode mixture layer formed on at least one surface of the anode current collector, wherein the anode mixture layer comprises an anode active material, a binder and a conductive material; a loading amount of the anode mixture layer is 5 mg/cm$^2$ to 15 mg/cm$^2$; and an R value of the anode mixture layer is 3,000 or less, where R is (permeability of the anode mixture layer)×(current density of the battery)$^2$.

The present inventors, in consideration of the fact that permeability of an anode and significant effects of the permeability and a current density of the anode on rapid charging characteristics, developed an index indicating the same and a method for measuring the permeability of the anode, thereby completing the present invention.

FIG. 1 is a diagram schematically illustrating a method for measuring permeability of an anode. Based on FIG. 1, an anode is conventionally configured to have a metal current collector (e.g., a copper foil) between two porous anode mixture layers, disabling to directly measure permeability.

Figure 1A:
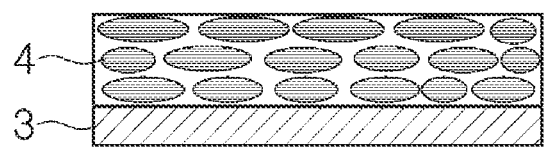
FIGS. 1A to 1C are diagrams schematically illustrating a method for measuring permeability of an anode.
Figure 1B:
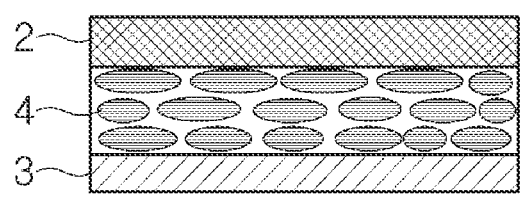
Figure 1C:
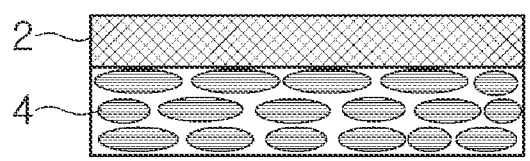

According to the present invention, a structure enabling measurement of permeability by separating an anode mixture layer without cracking is manufactured so that permeability of the anode mixture layer is specifically measured. More specifically, one surface of both surfaces of the anode mixture layer is removed using a solvent such as water, alcohol, or the like to easily detach one surface of the anode mixture layer from the anode current collector (FIG. 1A). A mesh tape is attached to the other surface of the anode mixture layer, which has not been removed (FIG. 1B). The anode mixture layer, to which the mesh tape is attached, is detached from the anode current collector together with the mesh tape, and the permeability of the anode can be measured from the structure (FIG. 1C).

The permeability of the structure may be measured, for example, in accordance with the JIP P8117 Gurley measurement method using a Gurley type Densometer (No. 158; Toyoseiki). The permeability of the anode may be calculated by measuring a time taken for 100 mL (or 100 cc) of air to pass through the structure of 1 inch$^2$ against the anode under a pressure of 0.05 MPa at room temperature. In this case, it is preferable that in order to prevent cracking of the anode mixture layer, the structure be positioned on the densometer such that a Drywall Joint tape (48 mm width; Fibatape) faces upward. In the present invention, it is preferable that the permeability of the anode mixture layer be an average value of 5 measurements of the permeability. In the present invention, a value of permeability for a loading amount of 10 mg/cm$^2$, obtained by dividing the average permeability value of the 5 measurements by an actual loading amount and multiplying 10, was used to compare each other while removing a difference in loading amounts of the anode mixture layer.

Meanwhile, a current density refers to an amount of current flowing through a unit surface area. The anode for the secondary battery of the present invention, having an R value of (permeability of the anode mixture layer)×(current density of a battery)$^2$ is preferably 3,000 or less, more preferably 2,800 or less, still more preferably 2,500 or less, most preferably 2,000 or less (excluding 0). When the R value of (permeability of the anode mixture layer)×(current density of a battery)$^2$ is greater than 3,000, a lifespan may be rapidly reduced by 80% of initial performance in less than 1,000 cycle under a rapid charging condition.

Within the range of the R value of (permeability of the anode mixture layer)×(current density of a battery)$^2$ of 3,000 or less, the permeability of the anode mixture layer is preferably 160 or less, more preferably 145 or less, most preferably 130 or less. When the R value exceeds 160, tortuosity of the electrode excessively increases and interferes with movement of an electrolytic solution, which may be disadvantageous in rapid charging, output and lifespan of a battery.

The anode active material included in the anode mixture layer of the present invention may be artificial graphite, and two or more anode active materials can be used, which is more preferable. In the case in which two or more anode active materials are used, it is preferable that artificial graphite be used as a first anode active material, and one or more selected from natural graphite, soft carbon, hard carbon, Si, Sn, Al, Ge, Pb, Bi, an Sb—Si—Z alloy, an Sn—Z alloy, a lithium titan oxide, a vanadium oxide and a lithium vanadium oxide be used as a second anode active material, where the Z is any one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te and Po. Meanwhile, natural graphite be included as the second anode active material. Further, it is preferable that the first anode active material be included in an amount of 50 wt % or more. When the content of the artificial graphite is less than 50 wt %, a lifespan may be rapidly reduced by 80% of initial performance in less than 1,000 cycle under a rapid charging condition. General lifespan characteristics may be inferior, as compared to an anode having a high artificial graphite content.

A binder included in an anode mixture layer is conventionally added to improve adhesion, or the like. In the present invention, one or more types of binder may be used. It is preferable that one of the binders used in the present invention have a glass transition temperature (Tg) of −15° C. to 0° C. When the glass transition temperature of one of the binders is beyond said range, it may be difficult to secure uniform quality during an anode rolling process or may lead to insufficient adhesion during a notching process of the anode or charging and discharging of the battery, thereby causing cracking and separate of the electrode. Further, permeability of a manufactured anode may increase from 30% to 200%, thereby deteriorating a long lifespan under the rapid charging condition. Meanwhile, any binder satisfying the above conditions can be unlimitedly used; for example, a styrene butadiene rubber (SBR) having a glass transition temperature Tg of −15° C. to 0° C. may be used.

Meanwhlie, a loading amount of the anode mixture layer is preferably 5 mg/cm$^2$ to 15 mg/cm$^2$, more preferably 8 mg/cm$^2$ to 15 mg/cm$^2$. When the loading amount is less than 5 mg/cm$^2$, uniform quality cannot be secured in an anode coating process. In addition, an increased number of stacked electrodes in a battery may make it difficult to increase an energy density, and manufacturing costs may increase. In contrast, when the loading amount is greater than 15 mg/cm$^2$, it may be difficult to sufficiently dry during the anode coating process. In the case of a battery with a high-energy density, a current density increases, which may facilitate precipitation of lithium metal on an anode surface during charging and discharging.

Meanwhile, a density of the anode is preferably 1.65 g/cc. When the density is greater than 1.65 g/cc, it may be difficult to secure uniform quality during an anode rolling process, and cracking and release of the electrode may be generated due to high stress of the anode during charging and discharging of the battery. Further, the R value and permeability of the anode may be increased by a high anode density, thereby deteriorating a long lifespan under the rapid charging conditions.

The anode mixture layer may further include a conductive material. The conductive material is added to a battery for conductivity without inducing a chemical change, and one or more selected from carbon black, acetylene black, furnace black, Ketjenblack, artificial graphite, natural graphite, silver, aluminum and copper can be used.

According to another aspect, a method for manufacturing an anode is provided, the method including applying an anode slurry comprises an anode active material, a binder and a conductive material onto an anode current collector and drying the same to form an anode mixture layer; and first rolling and second rolling the anode current collector formed with the anode mixture layer, wherein a ratio of a thickness of the anode mixture layer reduced by the first rolling to a thickness of the anode mixture layer reduced by the second rolling is 70:30 to 35:65.

Detailed descriptions of the anode active material, the binder and the conductive material will be omitted as described above. As the anode current collector, not only copper, stainless steel, a thin film formed of nickel but also a porous body having a mesh shape may be used. To prevent oxidation, the anode current collector may be coated with an oxidation-resistant metal or alloy coating.

The anode mixture layer may be manufactured by applying the anode slurry onto the anode current collector and drying the same. Conventional applying, drying and rolling methods in the art can be used. For example, a coating method employing a slot dye can be used as the applying method. In addition, a Meyer bar coating method, a gravure coating method, an immersion coating method, a spray coating method, or the like, may be used. Drying can be performed, for example, in a dry atmosphere at room temperature, and rolling can be performed by passing the anode mixture layer formed on the anode current collector by application and drying through a metal rolling roll of calendering equipment.

A thickness of the anode mixture layer is 500 μm or less (excluding 0), preferably 100 μm to 400 μm, more preferably 200 μm to 300 μm. A thickness greater than 500 μm may deteriorate operating workability during the applying and drying processes and requires a longer period of time, and thus is not preferable in terms of workability.

The method for manufacturing an anode according to the present invention preferably involves performing two rolling processes, that is, first rolling and second rolling, on an anode current collector in which the anode mixture layer is formed. In this case, in terms of performing the first rolling and the second rolling to implement a target thickness of the anode mixture layer by rolling, a ratio of a thickness of the anode mixture layer, reduced by the first rolling, to a thickness of the anode mixture layer, reduced by the second rolling, is preferably 70:30 to 35:65. When the ratio is outside said range, permeability of a rolling electrode increases, and rapid charging performance may be deteriorated.

Meanwhile, the first rolling and the second rolling may be performed at a temperature of 40° C. or less, preferably at room temperature.

The secondary battery including the anode according to the present invention may prevent an overvoltage of an anode surface and deposition of lithium metal in accordance therewith such that charging can be performed with a higher current, thereby improving the rapid charging performance and leading to an excellent lifespan in a certain current.

Mode for Invention

Hereinafter, the present invention will be described in more detail with reference to the embodiments. However, the description of these embodiments is only intended to illustrate the practice in the present invention, but embodiments are not limited thereto. The scope of the present invention should not be limited by the embodiments.

Preparation of Anode

Preparation Example 1

Artificial graphite and natural graphite were used as anode active materials, while controlling a weight ratio thereof to be 9:1. 1.2 wt % of carboxymethylcellulose and 1.5 wt % of an SBR having a glass transition temperature of −8° C. were used as binders. Pure water was added thereto to prepare an anode slurry.

The anode slurry was applied to a copper foil in a loading amount of 13.5 mg/cm$^2$ and dried by hot air to prepare an anode structure. The anode structure was rolled twice through roll press equipment to prepare an anode. In this case, a thickness reduction ratio of the anode structure was controlled to be 70:30 in accordance with the rollings.

After drying the prepared anode structure at a temperature of 140° C. in a vacuum oven, a cell was assembled. A density of the anode was 1.61 g/cc.

Meanwhile, permeability of the vacuum-dried anode was measured by the following method. To facilitate peeling of the anode, one surface of the anode was wiped several times with water and ethanol. A porous mesh tape was attached to the opposite surface of the anode. As the mesh tape, a construction joint mesh tape having a thickness of 0.25 mm and a width of 50 mm and a mesh size of 4 mm was used. As a result, a two-layer structure of a mesh tape/anode mixture layer was manufactured. Thus-manufactured two-layer structure was placed on a permeability measuring device (Mitsutoyo) with the mesh tape surface facing upward to measure the permeability, and an average value of five measurements was calculated. To compare without a difference in the loading amounts, the average value of the five measurements was divided by the loading amount, followed by multiplying 10 to convert into a value for the loading amount of 10 mg/cm$^2$. A resulting value was defined as the permeability of the cathode.

Preparation Example 2

The same method used in Preparation Example 1 was used to manufacture an anode and measure permeability, except that the loading amount was controlled to be 12.4 mg/cm$^2$.

Preparation Example 3

The same method used in Preparation Example 1 was used to manufacture an anode and measure permeability, except that the thickness of the electrode was increased during the rolling process to control the electrode density to be 1.56 g/cc.

Preparation Example 4

The same method used in Preparation Example 1 was used to manufacture an anode and measure permeability, except that artificial graphite was used as the anode active material.

Preparation Example 5

The same method used in Preparation Example 1 was used to manufacture an anode and measure permeability, except that the weight ratio of artificial graphite and natural graphite was controlled to be 7:3.

Preparation Example 6

The same method used in Preparation Example 1 was used to manufacture an anode and measure permeability, except that the weight ratio of artificial graphite and natural graphite was controlled to be 5:5.

Preparation Example 7

The same method used in Preparation Example 1 was used to manufacture an anode and measure permeability, except that the thickness reduction ratio of the anode structure in accordance with the two rolling processes was controlled to be 50:50.

Preparation Example 8

The same method used in Preparation Example 1 was used to manufacture an anode and measure permeability, except that the thickness reduction ratio of the anode structure in accordance with the two rolling processes was controlled to be 35:65.

Comparative Preparation Example 1

The same method used in Preparation Example 1 was used to manufacture an anode and measure permeability, except that the electrode density was controlled to be 1.66 g/cc.

Comparative Preparation Example 2

The same method used in Preparation Example 1 was used to manufacture an anode and measure permeability, except that the weight ratio of artificial graphite and natural graphite was controlled to be 3:7.

Comparative Preparation Example 3

The same method used in Preparation Example 1 was used to manufacture an anode and measure permeability, except that a SBR binder having a glass transition temperature of 3° C., Comparative Preparation Example 4

The same method used in Preparation Example 1 was used to manufacture an anode and measure permeability, except that a SBR binder having a glass transition temperature of 3° C., and the electrode density was controlled to be 1.66 g/cc.

Comparative Preparation Example 5

The same method used in Preparation Example 1 was used to manufacture an anode and measure permeability, except that the loading amount and the electrode density were controlled to be 15.4 mg/cm$^2$ and 1.51 g/cc, respectively.

Comparative Preparation Example 6

The same method used in Preparation Example 1 was used to manufacture an anode and measure permeability, except that the loading amount and the electrode density were controlled to be 7.3 mg/cm$^2$ and 1.7 g/cc, respectively.

Comparative Preparation Example 7

The same method used in Preparation Example 1 was used to manufacture an anode and measure permeability, except that the rolling was performed only once.

Comparative Preparation Example 8

The same method used in Preparation Example 1 was used to manufacture an anode and measure permeability, except that the thickness reduction ratio of the anode structure in accordance with the two rolling processes was controlled to be 13:87.

Comparative Preparation Example 9

The same method used in Preparation Example 1 was used to manufacture an anode and measure permeability, except that the thickness reduction ratio of the anode structure in accordance with the two rolling processes was controlled to be 50:50, and the temperature of the rolling roll was 40° C.

The artificial graphite/natural graphite weight ratio, types of the binders, the loading amounts, the electrode densities and measured permeability of the anodes of Preparation Examples 1 to 8 and Comparative Preparation Examples 1 to 9 are shown in Table 1.

TABLE 1

|  | Wt ratio of artificial/natural graphite | Tg of Binder | Anode loading amount (mg/cm$^2$) | Electrode density (g/cc) | 2x Press ratio | Rolling temp (° C.) | Permeability (sec/100 cc) |
| --- | --- | --- | --- | --- | --- | --- | --- |
| PE 1 | 9:1 | −8° C. | 13.5 | 1.61 | 70:30 | 25 | 123 |
| PE 2 | 9:1 | −8° C. | 12.4 | 1.61 | 70:30 | 25 | 121 |
| PE 3 | 9:1 | −8° C. | 13.5 | 1.56 | 70:30 | 25 | 87 |

TABLE 1-continued

|  | Wt ratio of artificial/natural graphite | Tg of Binder | Anode loading amount (mg/cm²) | Electrode density (g/cc) | 2x Press ratio | Rolling temp (° C.) | Permeability (sec/100 cc) |
|---|---|---|---|---|---|---|---|
| PE 4 | 10:0 | −8° C. | 13.5 | 1.61 | 70:30 | 25 | 118 |
| PE 5 | 7:3 | −8° C. | 13.5 | 1.61 | 70:30 | 25 | 132 |
| PE 6 | 5:5 | −8° C. | 13.5 | 1.61 | 70:30 | 25 | 145 |
| PE 7 | 9:1 | −8° C. | 13.5 | 1.61 | 50:50 | 25 | 141 |
| PE 8 | 9:1 | −8° C. | 13.5 | 1.61 | 35:65 | 25 | 136 |
| CPE 1 | 9:1 | −8° C. | 13.5 | 1.66 | 70:30 | 25 | 173 |
| CPE 2 | 3:7 | −8° C. | 13.5 | 1.61 | 70:30 | 25 | 185 |
| CPE 3 | 9:1 | 3° C. | 13.5 | 1.61 | 70:30 | 25 | 163 |
| CPE 4 | 9:1 | 3° C. | 13.5 | 1.66 | 70:30 | 25 | 252 |
| CPE 5 | 9:1 | −8° C. | 15.4 | 1.51 | 70:30 | 25 | 72 |
| CPE 6 | 9:1 | −8° C. | 7.3 | 1.7 | 70:30 | 25 | 231 |
| CPE 7 | 9:1 | −8° C. | 13.5 | 1.61 | 100:0 | 25 | 169 |
| CPE 8 | 9:1 | −8° C. | 13.5 | 1.61 | 13:87 | 25 | 172 |
| CPE 9 | 9:1 | −8° C. | 13.5 | 1.61 | 50:50 | 40 | 191 |

*PE: Preparation Example
**CPE: Comparative Preparation Example

Examples 1 to 8, Comparative Preparation Examples 1 to 9: Evaluation of Rapid Charging Performance of Battery A cathode slurry was prepared by mixing 96.5 parts by weight of an NCM-based cathode active material, 1.0 part by weight of a carbon black conductive material, 1.0 part by weight of a graphite-based conductive material, 1.5 parts of a PVDF binder, and NMP. The cathode slurry was applied to an aluminum thin film so as to have a constant ratio to the anode loading amount and allowed to pass through a hot air drying furnace to prepare a cathode structure. A cathode was manufactured by rolling thus-prepared cathode structure to a predetermined thickness using roll press rolling equipment.

The anodes of Preparation Examples 1 to 8 and Comparative Preparation Examples 1 to 9 and the cathode were punched to a predetermined size, followed by stacking the same and a polyethylene resin separating film in order to prepare a jelly roll. The prepared jelly rolled was then inserted into a formed pouch, and cathode and anode taps were welded, followed by injecting a carbonate-based electrolytic solution to manufacture a lithium ion battery cell. Gas was removed after pre-charging the prepared cell at a low rate, and the cell was subject to a full charging process at a low rate to complete a formation process.

Charging and discharging of the lithium ion battery cell was performed three times at a rate of 0.3 C. In this time, the discharging was performed in a CC mode until reaching 2.5 V, and the charging was performed in the CC mode until reaching 4.2 V. The CC mode was then changed to a CV mode to complete the charging. A current density was calculated using third-measured discharge capacity, a number of stacked cathode and a width of the cathode as shown in equation below. In this time, the current density values differ depending on a loading amount of the cathode and are shown in Table 2.

Current density [mAh/cm₂]=0.3 C rate discharge capacity [mAh]/No. of stacked anode [sheets]/2/surface area of anodes [cm²]

A product of permeability of the anodes according to Preparation Examples 1 to 8 and Comparative Preparation Examples 1 to 9, shown in Table 1, and a square of a current density was defined as R. A lifespan of thus-manufactured cell was measured under rapid charging conditions using a rapid charging evaluation method involving charging 70% of capacity during 40 min, and a result thereof is shown in Table 2.

TABLE 2

|  | Current Density (mAh/cm²) | R value | Cycle No. | Capacity retention ratio (%) |
|---|---|---|---|---|
| Ex 1 | 4.3 | 2274 | 1000 | 95 |
| Ex 2 | 3.94 | 1878 | 1000 | 98 |
| Ex 3 | 4.3 | 1609 | 1000 | 98 |
| Ex 4 | 4.3 | 2182 | 1000 | 95 |
| Ex 5 | 4.3 | 2441 | 1000 | 91 |
| Ex 6 | 4.3 | 2681 | 1000 | 88 |
| Ex 7 | 4.3 | 2607 | 1000 | 94 |
| Ex 8 | 4.3 | 2515 | 1000 | 95 |
| CE 1 | 4.3 | 3199 | 712 | 85 |
| CE 2 | 4.3 | 3421 | 769 | 80 |
| CE 3 | 4.3 | 3014 | 812 | 85 |
| CE 4 | 4.3 | 4659 | 118 | 80 |
| CE 5 | 4.89 | 1722 | 588 | 80 |
| CE 6 | 2.32 | 5524 | 1000 | 89 |
| CE 7 | 4.3 | 3125 | 869 | 85 |
| CE 8 | 4.3 | 3180 | 833 | 85 |
| CE 9 | 4.3 | 3532 | 804 | 85 |

*Ex: Example
**CE: Comparative Example

As shown in Table 2, in the case of Examples 1 to 8 having an R value of 3,000 or less, significantly excellent characteristics were exhibited in terms of a number of cycles and a capacity retention ratio as compared to Comparative Examples 1 to 9 having an R value greater than 3,000. In particular, Examples 2 and 3 having an R value of 2,000 or less were shown to have a 98% capacity retention ratio.

While the example embodiments have been shown and described above, it will be apparent to those skilled in the art that modifications and variations could be made without departing from the scope of the present invention as defined by the appended claims.

EXPLANATION OF REFERENCE NUMERAL

2: mesh tape

3: anode current collector

4: anode mixture layer

The invention claimed is:

1. A secondary battery, comprising an anode,
   wherein the anode comprises an anode current collector; and a porous anode mixture layer formed on at least one surface of the anode current collector,
   wherein the porous anode mixture layer comprises an anode active material and a binder;
   permeability of the porous anode mixture layer is greater than 72 sec/100 cc and 160 sec/100 cc or less; and
   an R value of the porous anode mixture layer is 3,000 or less (excluding 0), where R is (permeability of the porous anode mixture layer)×(current density of the secondary battery)$^2$.

2. The secondary battery of claim 1, wherein the R value of the porous anode mixture layer is 2,000 or less (excluding 0).

3. The secondary battery of claim 1, wherein the anode active material is artificial graphite.

4. The secondary battery of claim 1, wherein the anode active material includes artificial graphite as a first active material, and one or more selected from natural graphite, soft carbon, hard carbon, Si, Sn, Al, Ge, Pb, Bi, an Sb—Si—Z alloy, an Sn—Z alloy, a lithium titan oxide, a vanadium oxide and a lithium vanadium oxide, as a second anode active material,
   wherein the first anode active material is included in an amount of 50 wt % or more,
   where Z is any one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te and Po.

5. The secondary battery of claim 1, wherein a density of the anode is 1.65 g/cc or less.

6. The secondary battery of claim 1, wherein a density of the anode is 1.56 g/cc to 1.61 g/cc.

7. The secondary battery of claim 1, wherein a loading amount of the porous anode mixture layer is 5 mg/cm$^2$ to 15 mg/cm$^2$.

8. The secondary battery of claim 1, wherein a loading amount of the porous anode mixture layer is 8 mg/cm$^2$ to 15 mg/cm$^2$.

9. The secondary battery of claim 1, wherein a loading amount of the porous anode mixture layer is 12.4 mg/cm$^2$ to 13.5 mg/cm$^2$.

10. The secondary battery of claim 1, wherein the porous anode mixture layer further comprises a conductive material.

11. The secondary battery of claim 10, wherein the conductive material includes one or more selected from carbon black, acetylene black, furnace black, Ketjenblack, artificial graphite, natural graphite, silver, aluminum and copper.

* * * * *